Dec. 20, 1960 P. J. LEESON ET AL 2,965,137
PRESSURE SENSER
Filed Nov. 20, 1957 2 Sheets-Sheet 1

INVENTORS
Plato J. Leeson
William F. Weatherford
by Carlson, Pitzner, Hubbard & Wolfe
ATTORNEYS Dec. 20, 1960 P. J. LEESON ET AL 2,965,137
PRESSURE SENSER
Filed Nov. 20, 1957 2 Sheets-Sheet 2

INVENTORS
Plato J. Leeson
William F. Weatherford
by Carlson, Pigney, Hubbard & Wolfe
ATTORNEYS United States Patent Office 2,965,137
Patented Dec. 20, 1960

2,965,137

PRESSURE SENSER

Plato J. Leeson and William F. Weatherford, Rockford, Ill., assignors to Woodward Governor Company, Rockford, Ill., a corporation of Illinois Filed Nov. 20, 1957, Ser. No. 697,626

6 Claims. (Cl. 137—785)

This invention relates to a device for measuring pressure changes in a fluid and including a yieldable wall, such as a diaphragm or a bellows exposed on one side to the pressure fluid so that the bellows expands and contracts in response to pressure changes. Devices of this type may be used in gas turbine controls, such as in an aircraft engine, to measure the pressure changes in the air admitted to or discharged from the compressor in which case the controls including the pressure senser are enclosed in a casing filled with liquid under pressure. In order that changes in pressure of the surrounding medium such as this liquid do not effect the action of the bellows, the latter is opposed by a reference bellows which is evacuated so that the pressure being measured is opposed by a constant pressure.

The primary object of the invention is to provide a pressure senser of the above character which continues to perform its intended pressure sensing function in the event of a failure of one of the bellows.

A more detailed object is to employ a third bellows which is subjected to a second constant pressure and which normally is inactive but which becomes active to oppose the main bellows in the event that the reference bellows fails.

The invention also resides in the novel arrangement by which the pressure senser is able to continue to function even in the event of a failure in any one of the three bellows.

Other objects and advantages of the invention will become apparent from the following detailed description taken in connection with the accompanying drawings, in which Figure 1 is a fragmentary sectional view of a pressure senser embodying the novel features of the present invention.

Figure 1:
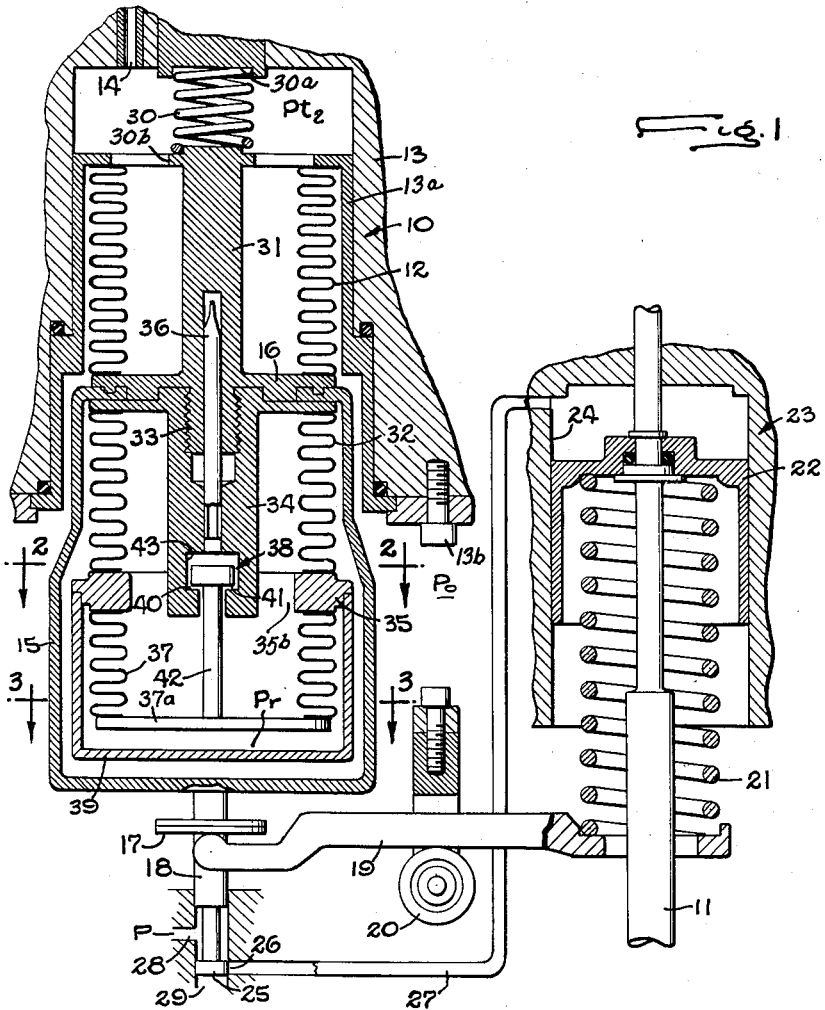

As shown in the drawings for purposes of illustration, the pressure senser 10 of the present invention is adapted for use in conjunction with a gas turbine of the type which may be employed in an aircraft engine. Fuel is supplied to the engine under the control of a suitable valve (not shown) which is activated by a rod 11. The latter moves in response changes in a pressure $Pt_2$, which herein is the pressure at the inlet of the compressor of the engine, and this pressure is measured by the pressure senser 10. For this purpose, the pressure senser includes a primary yieldable wall, herein a bellows 12, which is disposed within a casing 13 with its outer end anchored to an inturned flange at the upper end of a tube 13$^a$ telescoped into the casing 13 and held therein by screws 13$^b$. The interior of the bellows communicates with the compressor inlet through a restricted passage 14. The casing 13 is filled with a liquid which in this case is the fuel for the engine and is under a pressure $Po$.

In order to convert changes in the pressure $Pt_2$ into movement of the fuel valve activating rod 11, a yoke 15 is secured to and depends from a wall member in the form of a plate 16 secured to and closing the freely movable inner end of the bellows 12. An abutment 17 on a stem 18 which depends from the lower end of the yoke engages one end of a lever 19 fulcrumed at 20. The other end of the lever seats against the lower end of a compression spring 21 whose other end abuts against the underside of the piston 22 of a servo 23. The servo piston slides in a cylinder 24 and is connected to the valve rod 11. On the lower end of the stem 18 is a valve 25 which, through a port 26 and a line 27, connects the upper end of the cylinder 24 either with a pressure source P through a port 28 or to drain through a port 29.

With the foregoing arrangement, the parts are in the position shown in Fig. 1 when the system is in balance, that is, the force of the spring 21 balances the pressure in the cylinder 24 above the piston 22 and the spring force also, acting through the lever 19 and the yoke 15, balances the pressure $Pt_2$ plus the spring force of the bellows 12 and the force of a calibrating spring 30. The latter acts in compression between a seat 30$^a$ on the casing 13 and a head 30$^b$ on the upper end of a stem 31 projecting up into the bellows from the plate 16.

Upon an increase in the pressure $Pt_2$, the bellows 12 expands moving the stem 18 down. This turns the lever 19 counterclockwise as viewed in Fig. 1 so that the spring 21 is compressed and urges the piston 22 upwardly. Simultaneously, the pilot valve 25 connects the ports 28 and 26 with a resulting build up of pressure in the cylinder 24. The increase of pressure continues until the piston moves down sufficiently to return the lever 19 and the pilot valve to their original positions and restores equilibrium to the system. This movement of the piston shifts the rod 11 and changes the setting of the fuel valve an amount correlated with the change in the pressure $Pt_2$.

With a decrease of the pressure $Pt_2$, the pilot valve 25 connects the cylinder 24 to drain and the pressure in the cylinder decreases. This results in the piston 22 moving up until the reduced pressure balances the force of the spring 21 and the lever 19 returns to the normal position. Thus, the setting of the fuel valve is changed in the opposite direction.

Figure 2:
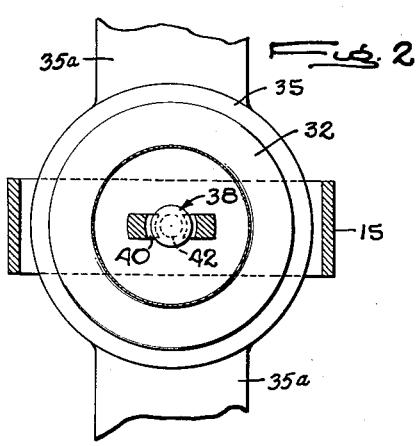
Fig. 2 is a sectional view taken along the line 2—2 in Fig. 1.
Figure 3:
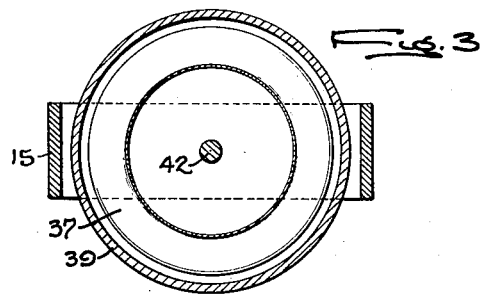
Fig. 3 is a sectional view taken along the line 3—3 in Fig. 1.
Figure 4:
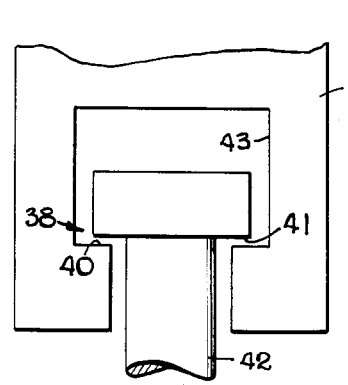
Fig. 4 is an enlarged fragmentary view of the novel connection which renders the auxiliary bellows active when the reference bellows fails.

Since the casing 13 is filled with fuel under pressure $Po$ and since this pressure varies, the bellows 12 is arranged to act in opposition to a second yieldable wall such as an intermediate reference bellows 32 which is submerged in the fuel and is evacuated to 0 p.s.i.a. so that the system responds to changes in the absolute pressure at the compressor inlet. The free and movable end of the reference bellows is secured to the closed inner end of the bellows 12 by the plate 16 through the medium of a threaded connection 33 between the stem 31 and a stem 34 projecting into the reference bellows. The latter is fastened at its other end to a stationary part in the form of a ring 35 made rigid with the casing 13 through the medium of arms 35$^a$ (Fig. 2) projecting from opposite sides of the ring and suitably fastened to the casing 13. The interior of the bellows 32 is evacuated through a tube 36 which projects through the stem 34 and is pinched closed after the evacuation.

According to the present invention, the pressure senser 10 is constructed and arranged in a novel manner so that it continues to perform its intended function even in the event of a rupture or failure of one of the bellows. To this end, the pressure senser employs a third or auxiliary yieldable wall, herein a bellows 37, which is closed by a wall 37a at its outer end and normally is inactive but becomes active upon failure of the reference bellows. The auxiliary bellows is subjected continuously to a constant pressure slightly above the zero pressure in the reference bellows and normally is not connected to the main bellows 12. Through a lost motion connection 38, however, the auxiliary bellows 37 opposes the main bellows 12 upon failure of the reference bellows 32.

In the present instance, one end of the auxiliary bellows 37 is anchored to the ring 35 in axial alinement with the first and intermediate bellows 12 and 32 and this bellows is enclosed within a cup-shaped housing 39. The interior of the latter is evacuated to a pressure $Pr$ which herein may be on the order of 5 p.s.i.a. and constitutes an auxiliary reference pressure. The interior of the auxiliary bellows 37 communicates with the interior of the reference bellows 32 through a passage 35b at the center of the ring 35 and thus both bellows are evacuated to 0 p.s.i.a.

To form the lost motion connection 38, opposed abutments 40 and 41 are carried by the free ends of the reference bellows 32 and the auxiliary bellows 37 respectively. These abutments are spaced apart a distance great enough that they do not engage each other in the normal operation of the pressure senser 10 but do engage under certain conditions of failure as will be explained in detail subsequently. Herein, the abutment 41 is an enlarged head on the upper end of rod 42 upstanding from the lower or free end of the auxiliary bellows 37. The head 41 is received in a bore 43 formed in the lower end of the stem 34 and shouldered at its lower end to constitute the abutment 40.

When the pressure senser 10 is used in connection with the gas turbine of an aircraft engine, the casing 13 may conveniently be filled with fuel under a pressure ($Po$) which normally ranges between 20 and 25 p.s.i.a. The compressor inlet pressure ($Pt_2$) varies with the speed and altitude of the aircraft and may range from 0.5 to 40 p.s.i.a. although usually it is less than the pressure $Po$. As stated earlier, the interiors of the bellows 32 and 37 are evacuated to 0 p.s.i.a. while the interior of the housing 39 is evacuated to a pressure ($Pr$) on the order of 5 p.s.i.a. Under these conditions, the pressure $Pt_2$ within the bellows 12 opposes the zero pressure inside the bellows 32. Thus, the force applied to the left end of the lever 19 is a combination of the force due to the pressure $Pt_2$ and the forces of the spring effects of the bellows 12 and 32 and the spring 30, the bellows 37 being completely inactive. As a result, movement of the yoke 15, and hence of the valve rod 11, is a direct measure of the change in the pressure $Pt_2$. During such movement, the abutments 40 and 41 remain out of engagement.

Figure 5:
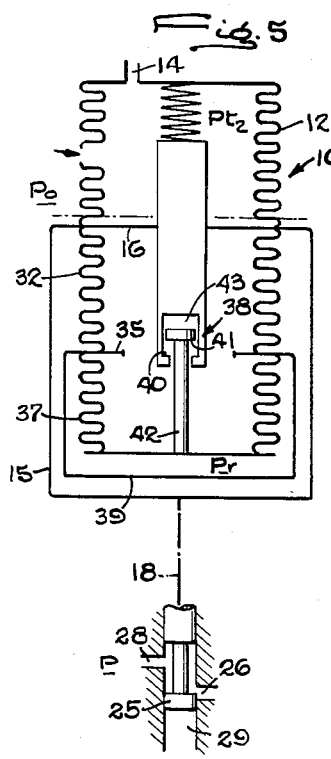
Figs. 5, 6 and 7 are schematic views respectively illustrating the action of the pressure senser when the main, reference and auxiliary bellows fail.

Should the main bellows 12 fail as illustrated by the arrow in Fig. 5, the fuel under the pressure $Po$ in the casing 13 will leak into this bellows providing the pressure $Po$ is greater than the pressure $Pt_2$ as it normally is. This results in an increased flow of fuel to the gas turbine for two reasons. First, the fuel leaking into the bellows 12 flows to the compressor inlet, although this flow is comparatively small due to the restricted passage 14. Second, the pressure inside the bellows 12 increases slightly shifting the yoke 15 down as shown in Fig. 5. As explained previously, this causes the valve rod 11 to move in the valve opening direction. Although there is an increase in the supply of fuel, this increase is comparatively small and is within the limits of safe operation of the aircraft engine. Moreover, the bellows 12 continues to respond to changes in the pressure at the compressor inlet so that this bellows still performs its intended function.

If the case pressure $Po$ should be less than the pressure $Pt_2$, the pressure inside the main bellows 12 will leak out. This will cause a slight reduction in the latter pressure and hence a small reduction in the fuel valve setting. This reduction is within the limits of safe operation and, as in the previous case, the bellows 12 continues to expand and contract with changes in the pressure at the compressor inlet.

Figure 6:
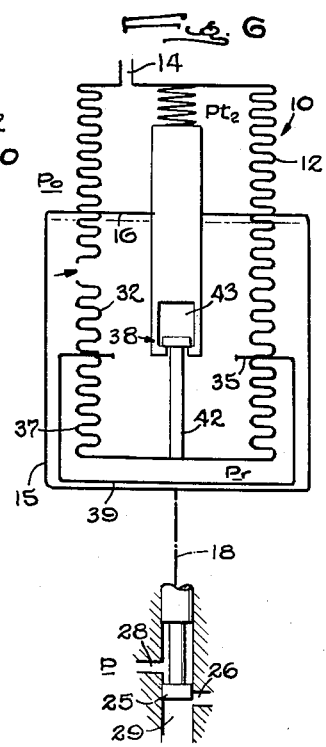

A failure of the reference bellows 32 also causes only a slight change in the setting of the fuel valve and permits continued safe operation of the pressure senser 10. With such a failure as indicated by the arrow in Fig. 6 the case pressure $Po$ enters the interiors of the bellows 32 and 37. As a result, the free end of the reference bellows 32 moves up while the free end of the auxiliary bellows 37 moves down thus taking up the available slack in the lost motion connection and bringing the abutments 40 and 41 into engagement as illustrated in Fig. 6. In this way, the pressure within these two bellows in effect locks the free ends together so that the pressure $Pt_2$ now opposes the pressure $Pr$ in the housing 39. Since the latter pressure is slightly higher than the zero pressure which originally oppose the pressure $Pt_2$, the yoke 15 is moved up and the fuel valve is closed a small amount. Once the case pressure has filled the bellows 32 and 37, the main bellows 12 continues to respond to the pressure $Pt_2$ and controls the fuel supply to the gas turbine. The decrease of the fuel under these conditions has been found to be 13 percent or less, this being within the safe limits.

Figure 7:
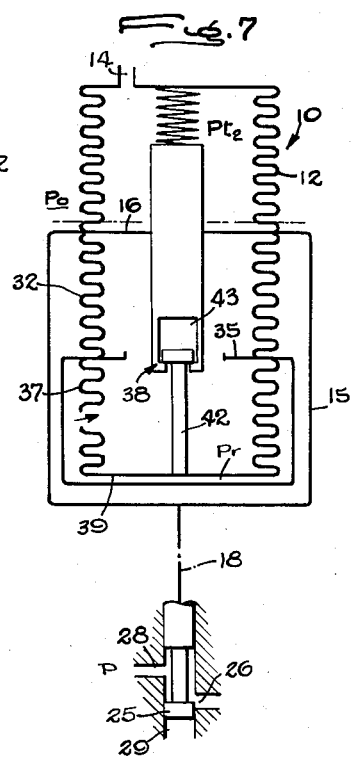

The pressure senser 10 also continues to respond to the pressure at the compressor inlet and to control the fuel valve when the auxiliary bellows 37 fails as indicated by the arrow in Fig. 7. In that case, the pressure $Pr$ leaks into the bellows 32 and 37 and causes engagement of the abutments 40 and 41. The pressure within these two bellows and within the housing then is the same and is less than the original pressure $Pr$ and greater than the zero pressure originally within the bellows. Normally, this would raise the yoke 15 and produce a decrease in the fuel supply rate. At this time, however, there is no pressure counterbalancing the force due to the spring effect of the auxiliary bellows 37. In the illustrated embodiment, this force is greater than the effect of the increased pressure within the two bellows 32 and 37 so that the net result is a downward movement of the yoke and an increase in the fuel supply rate, the increase being on the order of 10 percent or less. Although the pressure $Pt_2$ now is opposed by a slightly different pressure, the valve rod 11 still moves in response to changes in the pressure $Pt_2$.

It will be observed that a pressure senser constructed in accordance with the invention continues to respond to changes in the pressure $Pt_2$ even if any one of the bellows 12, 32 and 37 should fail. Although the position of the rod 11 and hence of the fuel valve is changed somewhat in the event of such a failure, the deviation from the desired setting is small and falls well within the limits of safe operation when the pressure senser is used in connection with the controls of an aircraft engine. In other words, a failure of one of the bellows simply causes a minor shifting of the fuel scheduling for the engine while the pressure senser continues its functions of measuring the pressure at the compressor inlet and controlling the fuel schedule in response to changes of this pressure. It should be observed that the pressure $Pr$ may be 0 p.s.i.a. but it is preferred to use a pressure somewhat higher so that a failure of either of the bellows 32 and 37 will cause a change in the fuel schedule and indicate a failure which should be corrected.

We claim as our invention:

1. A pressure sensing device comprising a casing, a liquid under pressure within said casing, a first bellows disposed within said casing and having one end anchored to the casing, a second bellows disposed within said casing and alined with said first bellows, a wall member closing the free end of said first bellows and connecting the same to the adjacent end of said second bellows, a stationary part disposed adjacent and anchored to the other end of said second bellows, means for admitting a fluid under pressure to the interior of said first bellows, said second bellows being evacuated whereby said member moves in response to changes in pressure of said fluid, a third bellows disposed within said casing in alinement with said second bellows and having one end anchored to said stationary part, the other end being closed and freely movable, a passage connecting the interiors of said second and third bellows whereby both bellows are evacuated, a housing enclosing said third bellows and being evacuated to a pressure greater than the pressure within said third bellows, and a lost motion connection within said second and third bellows comprising elements rigid with the free ends of said second and third bellows respectively and having opposed abutments thereon spaced apart to engage and limit relative movement of the free ends of said second and third bellows upon abnormal movement of said wall member.

2. A pressure sensing device comprising a casing, a first bellows disposed within said casing and having one end anchored to the casing, means for admitting a fluid under pressure to the interior of said bellows, a second bellows disposed within said casing with one end anchored to the casing and with the free end thereof opposing the free end of said first bellows, a wall member connecting and closing the free ends of said two bellows, said second bellows being evacuated whereby said member moves in response to changes in the pressure of said fluid, a third bellows disposed within said casing and having one end anchored to said casing, the other end being free, and closed, a passage connecting the interiors of said second and third bellows whereby both are evacuated, a housing enclosing said third bellows and being evacuated to a pressure greater than the pressure within the third bellows, a fluid under pressure filling said casing and surrounding said first and second bellows, a first element connected to the free end of said second bellows and extending axially along the interior of the latter, a second element connected to the free end of said third bellows and extending axially along the interior of the third bellows, at least one of said elements projecting through said passage to overlap the other element, and opposed surfaces on said elements normally spaced apart and operable to limit relative expansion of said second and third bellows to a degree in excess of the normal movement of said member.

3. A pressure sensing device comprising a casing, a liquid under pressure within said casing, a first bellows disposed within said casing and having one end anchored to the casing, a second bellows disposed within said casing and alined with said first bellows, a wall member closing the free end of said first bellows and connecting the same to the adjacent end of said second bellows, a stationary part disposed adjacent and anchored to the other end of said second bellows, means for admitting a fluid under pressure to the interior of said first bellows, said second bellows being evacuated whereby said member moves in response to changes in pressure of said fluid, a third bellows disposed within said casing in alinement with said second bellows and having one end anchored to said part, the other end of said third bellows being closed and freely movable, a passage connecting the interiors of said second and third bellows whereby both bellows are evacuated, a housing enclosing said third bellows and being evacuated to a pressure greater than the pressure within said third bellows, and opposed abutments rigidly connected respectively to the free ends of said second and third bellows and spaced apart to engage and limit relative movement of those free ends upon abnormal movement of said member.

4. A pressure sensing device comprising a casing, a first bellows disposed within said casing and having one end anchored to the casing, means for admitting a fluid under pressure to the interior of said bellows, a second bellows disposed within said casing with one end anchored to the casing and with the free end thereof opposing the free end of said first bellows, a wall member closing the free ends of said two bellows and joining these ends together, said second bellows being evacuated whereby said member moves in response to changes in the pressure of said fluid, a third bellows disposed within said casing and having one end anchored to the casing, the other end of the bellows being closed and freely movable, a passage connecting the interiors of said second and third bellows whereby both are evacuated, a housing enclosing said third bellows and being evacuated to a pressure greater than the pressure within the third bellows, a fluid under pressure filling said casing and surrounding said first and second bellows, and a lost motion connection between the free ends of said second and third bellows and operable to limit relative expansion of the two bellows to a degree in excess of the normal movement of said member.

5. A pressure sensing device comprising a casing, a liquid under pressure within said casing, a first bellows disposed within said casing and having one end anchored to the casing, a second bellows disposed within said casing and alined with said first bellows, a wall member closing the free end of said first bellows and connecting the same to the adjacent end of said second bellows, a stationary part disposed adjacent and anchored to the other end of said second bellows, means for admitting a fluid under pressure to the interior of said first bellows, said second bellows being evacuated whereby said part moves in response to changes in the pressure of said fluid, a third bellows disposed within said casing in alinement with said second bellows and having one end anchored to said part, a wall closing the other and free end of said third bellows, a passage connecting the interiors of said second and third bellows so that both bellows are evacuated, a housing enclosing said third bellows and evacuated to a pressure greater than the pressure within the third bellows, and a lost motion connection projecting through said passage and comprising elements respectively rigid with said wall and wall member, said elements having opposed abutments thereon spaced apart to engage each other and limit separation of the free ends of said second and third bellows upon abnormal movement of said wall member.

6. A device for sensing changes in a control pressure comprising first, intermediate, and third bellows arranged in end to end relation along a common axis with the inner ends of the first and third bellows respectively joined to opposite ends of the intermediate bellows, a wall member closing the connected ends of said first and intermediate bellows and mounted for movement along said axis, a stationary part supporting the connected ends of said intermediate and third bellows, a wall closing the outer end of said third bellows and normally movable relative to said wall member along said axis through a limited normal operating range, said intermediate and third bellows communicating with each other and being evacuated, a stationary housing enclosing said third bellows and defining a space around the latter evacuated to a pressure slightly higher than the pressure within the third bellows, a fluid filled casing supporting said stationary part and enclosing said first and intermediate bellows and said housing, and means operable to prevent separation of said wall and wall member beyond said range.

References Cited in the file of this patent
UNITED STATES PATENTS
2,778,350    Reggio _____ Jan. 22, 1957